US012655336B2

(12) United States Patent
Takeuchi et al.

(10) Patent No.: US 12,655,336 B2
(45) Date of Patent: Jun. 16, 2026

(54) CURABLE HOTMELT SILICONE COMPOSITION, ENCAPSULANT, HOTMELT ADHESIVES, AND OPTICAL SEMICONDUCTOR DEVICE

(71) Applicant: Duroptix Materials Kabushiki Kaisha, Tokyo (JP)

(72) Inventors: Shunya Takeuchi, Chiba (JP); Yuri Iguchi, Tochigi (JP)

(73) Assignee: Duroptix Materials Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/596,157

(22) Filed: Mar. 5, 2024

(65) Prior Publication Data

US 2024/0301262 A1      Sep. 12, 2024

(30) Foreign Application Priority Data

Mar. 10, 2023      (JP) ................................. 2023-037658

(51) Int. Cl.
| | |
|---|---|
| *C09J 183/04* | (2006.01) |
| *C08G 77/00* | (2006.01) |
| *C08G 77/20* | (2006.01) |
| *C08L 83/04* | (2006.01) |
| *C09J 7/35* | (2018.01) |
| *C09J 11/08* | (2006.01) |

(52) U.S. Cl.
CPC ............ *C09J 183/04* (2013.01); *C08G 77/70* (2013.01); *C08L 83/04* (2013.01); *C09J 7/35* (2018.01); *C09J 11/08* (2013.01); *C08G 77/20* (2013.01); *C08G 77/80* (2013.01); *C08L 2203/206* (2013.01); *C09J 2203/326* (2013.01); *C09J 2301/304* (2020.08)

(58) Field of Classification Search
CPC ... C09J 183/04; C09J 7/35; C09J 11/08; C09J 2203/326; C09J 2301/304; C08L 83/04; C08L 2203/206; C08L 2205/025; C08L 2205/035; C08L 83/00; C08G 77/20; C08G 77/70; C08G 77/80; C08G 77/045; C08G 77/12; C08G 2170/20; H10H 20/854; C09K 3/10

See application file for complete search history.

(56) References Cited

U.S. PATENT DOCUMENTS

2021/0032471 A1* 2/2021 Takeuchi ................. C08K 3/36

FOREIGN PATENT DOCUMENTS

| JP | 2013-001794 A | 1/2013 |
|---|---|---|
| JP | 2021-21058 A | 2/2021 |
| JP | 2022-84179 A | 6/2022 |

* cited by examiner

*Primary Examiner* — Christopher W Raimund
(74) *Attorney, Agent, or Firm* — Ingrassia Fisher & Lorenz, LLP | IF&L

(57) ABSTRACT

A curable hot-melt silicone composition, comprising, (A) a resinous alkenyl group-containing organopolysiloxane that includes at least two alkenyl groups and at least one aryl group per molecule, (B) a curable linear organopolysiloxane that includes at least one aryl group per molecule, (C) a curable linear or branched organopolysiloxane that includes at least one aryl group per molecule, where the aryl group content is less than 40 mol % for (C), 40 mol % or more for (A); and (B), and (D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit per molecule or that have an aryl group content of 20 mol % or less, (E) an organohydrogenpolysiloxane having at least 2 silicon atom-bonded hydrogen atoms per molecule, that is different from component (D), and (F) a curing catalyst.

20 Claims, No Drawings

CURABLE HOTMELT SILICONE COMPOSITION, ENCAPSULANT, HOTMELT ADHESIVES, AND OPTICAL SEMICONDUCTOR DEVICE

CROSS-REFERENCE TO RELATED APPLICATIONS

This application claims priority pursuant to 35 U.S.C. 119(a) to Japanese Application No. 2023-037658, filed Mar. 10, 2023, which application is incorporated herein by reference in its entirety.

TECHNICAL FIELD

The present invention relates to a curable hot-melt silicone composition, and more specifically relates to a curable hot-melt silicone composition that is suitable for use in sealing materials for optical semiconductors. The present invention also relates to an optical semiconductor device sealed with a sealing material comprising a cured product of such a curable hot-melt silicone composition.

BACKGROUND ART

When curable silicone compositions are cured, they form cured products having excellent heat resistance, cold resistance, electrical insulation properties, weather resistance, water repellency, and transparency, and so they are used in a wide range of industrial fields. In particular, as compared to other organic materials, these cured products are less prone to discoloration and their physical properties such as durability deteriorate less, and so they are used for optical materials, and in particular are widely used as silicone sealing materials used in optical semiconductor devices such as light-emitting diodes (LEDs).

In addition, hot-melt silicones that are curable and that are non-fluid at room temperature, that can be formed into a sheet or film, and that melt into a fluid upon being heated have been used as sealing materials for semiconductor devices or as hot-melt adhesives.

For example, Patent Document 1 describes a cross linkable silicone composition which is cross linked via a hydrosilylation reaction to form a cross linked product that is a solid having high hardness at room temperature and that significantly softens or liquefies at high temperatures, said cross linkable silicone composition comprising at least: (A) an organopolysiloxane represented by average unit formula: $(R^1_3SiO_{1/2})_a(R^1_2SiO_{2/2})_b(R^1SiO_{3/2})_c(SiO_{4/2})_d(R^2O_{1/2})_e$ (in the formula, $R^1$ is a phenyl group, C1-6 alkyl group or cycloalkyl group, or C2-6 alkenyl group, where 60-80 mol % of $R^1$ are phenyls and 10-20 mol % of $R^1$ are alkenyl groups, and $R^2$ is a hydrogen atom or a C1-6 alkyl group, where a, b, c, d and e are numbers satisfying 0≤a≤0.2, 0.2≤b≤0.7, 0.2≤c≤0.6, 0≤d≤0.2, 0≤e≤0.1, and a+b+c+d=1); (B) an organopolysiloxane represented by general formula: $R^3_3SiO)(R^3_2SiO)_mSiR^3_3$ (in the formula, $R^3$ is a phenyl group, C1-6 alkyl group or cycloalkyl group, or C2-6 alkenyl group, where 40-70 mol % of $R^3$ are phenyl groups, at least one $R^3$ is an alkenyl group, and m is an integer of 5-100) {in an amount of 0-20 parts by weight with respect to 100 parts by weight of component (A)}; (C) an organopolysiloxane having two silicon atom-bonded hydrogen atoms per molecule, where 30-70 mol % of the silicon atom-bonded organic groups are phenyl groups {in an amount such that the molar ratio of the silicon atom-bonded hydrogen atoms in this component with respect to the total amount of alkenyl groups in the components (A) and (B) is 0.5-2}; and (D) a hydrosilylation reaction catalyst {in an amount sufficient to promote the hydrosilylation reaction of alkenyl groups in components (A) and (B) with the silicon atom-bonded hydrogen atoms in component (C)}.

Patent Document 2 describes a solvent-free curable hot-melt silicone composition comprising: (A) an alkenyl group-containing organopolysiloxane having at least 2 alkenyl groups per molecule; (B) a resinous organohydrogenpolysiloxane having at least 2 silicon atom-bonded hydrogen atoms per molecule, in an amount of 0.1 to 5% by mass relative to the total mass of the composition; (C) an additive represented by average unit formula (C-1): $(R^1_3SiO_{1/2})_a$ $(R^1_2SiO_{2/2})_b(R^1SiO_{3/2})_c$ (in the formula, $R^1$ are alkyl groups, aryl groups, alkenyl groups, aralkyl groups, or epoxy group-containing organic groups or alkoxy groups, which may be the same or different, except at least one $R^1$ is an alkenyl group, and at least one $R^1$ is an epoxy group-containing organic group; a, b, and c are numbers that satisfy 0≤a≤1.0, 0≤b≤1.0, 0≤c<0.9, respectively, and a+b+c=1); (D) a hydrosilylation catalyst; and (E) silica.

Patent Document 3 describes a hot-melt silicone composition comprising: (A) a resinous alkenyl group-containing organopolysiloxane in which silicon atom-bonded organic groups do not include epoxy group-containing organic groups, said resinous alkenyl group-containing organopolysiloxane comprising: (A-1) a resinous alkenyl group-containing organopolysiloxane that includes at least two alkenyl groups per molecule but no $(Ar_2SiO_{2/2})$ units; and (A-2) a resinous alkenyl group-containing organopolysiloxane that includes at least two alkenyl groups and at least one $(Ar_2SiO_{2/2})$ unit per molecule; (B) an organohydrogenpolysiloxane having at least two silicon atom-bonded hydrogen atoms per molecule; and (C) a curing catalyst, wherein component (A-1) is included in an amount of 5% by mass or more based on the total mass of all organopolysiloxane components.

However, problems with conventional curable hot-melt silicone compositions are that the adhesion may sometimes be too high when they are formed into films, making them difficult to handle. Another problem is that poor melt properties result when the adhesion is lowered. Yet another problem is that the cured product is not sufficiently transparent.

PRIOR ART DOCUMENTS

Patent Documents

[Patent Document 1] Japanese Unexamined Patent Publication No. 2013-001794
[Patent Document 2] Japanese Unexamined Patent Publication No. 2021-21058
[Patent Document 3] Japanese Unexamined Patent Publication No. 2022-84179

SUMMARY OF THE INVENTION

An object of the present invention is to provide a curable hot-melt silicone composition that has better handling in the form of a film, better melt properties, and better transparency upon being cured.

Another object of the present invention is to provide a sealing agent or hot-melt adhesive comprising the curable hot-melt silicone composition of the present invention. Yet another objective of the present invention is to provide an optical semiconductor device that is sealed with the sealing material of the present invention.

As a result of extensive research by the inventors to solve the above problems, the present invention was perfected upon the surprising discovery that the above problems can be solved by the combination of: a resinous organopolysiloxane having a specific structure (component A); a combination of specific linear organopolysiloxanes (components B and C) that are incompatible with this resinous organopolysiloxane; and a specific silicone reactive compatibilizer for improving the compatibility between the organopolysiloxanes of components A through C.

Accordingly, the present invention relates to:

A curable hot-melt silicone composition, comprising:

(A) a resinous alkenyl group-containing organopolysiloxane that includes at least two alkenyl groups and at least one aryl group per molecule, where the aryl group content is 40 mol % or more;

(B) a curable linear organopolysiloxane that includes at least one aryl group per molecule, where the aryl group content is 40 mol %;

(C) a curable linear or branched organopolysiloxane that includes at least one aryl group per molecule, where the aryl group content is less than 40 mol %;

(D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit (Ar represents an aryl group) per molecule or that have an aryl group content of 20 mol % or less;

(E) an organohydrogenpolysiloxane having at least 2 silicon atom-bonded hydrogen atoms per molecule, that is different from component (D); and (F) a curing catalyst, wherein the content of component (A) is 5% by mass or more, based on the total mass of the curable hot-melt silicone composition, and the mass ratio of the content of component (C) relative to the content of component (D) is less than 5.0.

The resinous alkenyl group-containing organopolysiloxane of component (A) preferably comprises a siloxane unit (T unit) represented by $RSiO_{3/2}$ and a siloxane unit (D unit) represented by $R_2SiO_{2/2}$.

The resinous alkenyl group-containing organopolysiloxane of component (A) is preferably represented by the following average unit formula (I): $(R^1_2SiO_{2/2})_s(R^1SiO_{3/2})_t$ (in the formula, $R^1$ indicates halogen-substituted or unsubstituted monovalent hydrocarbon groups, which may be the same or different, except at least two $R^1$ per molecule are alkenyl groups, $0<s<1$, $0<t<1$, and $s+t=1$).

The curable linear organopolysiloxane of component (B) preferably includes at least one $(AlArSiO_{2/2})$ unit (Al represents an alkyl group, and Ar represents an aryl group) per molecule.

Component (C) preferably comprises a curable linear organopolysiloxane having at least one $(Al_2SiO_{2/2})$ unit (Al represents an alkyl group) and at least one $(Ar_2SiO_{2/2})$ unit (Ar represents an aryl group) per molecule.

The organopolysiloxane of component (D-3) is preferably a resinous organopolysiloxane represented by average unit formula (IV-c): $(R^6_3SiO_{1/2})_p(ArSiO_{3/2})_q$ (in the formula, $R^6$ are hydrogen atoms, or halogen-substituted or unsubstituted monovalent hydrocarbon groups, which may be the same or different, Ar represents an aryl group, $0<p<1.0$, $0<q<1.0$, and $p+q=1.0$).

The present invention also relates to a sealing material or hot-melt adhesive which comprises the curable hot-melt silicone composition according to the present invention.

The present invention also relates to an optical semiconductor device that is sealed with the sealing material according to the present invention.

Effects of the Invention

The curable hot-melt silicone composition according to the present invention allows low tackiness to be maintained even when made into the form of a film and thus has better handling, has better melt properties, and allows a cured product having better transparency to be formed upon being cured.

MODES FOR CARRYING OUT THE INVENTION

[Curable Hot-Melt Silicone Composition]

The curable hot-melt silicone composition according to the present invention relates to:

A curable hot-melt silicone composition, comprising:

(A) a resinous alkenyl group-containing organopolysiloxane that includes at least two alkenyl groups and at least one aryl group per molecule, where the aryl group content is 40 mol % or more;

(B) a curable linear organopolysiloxane that includes at least one aryl group per molecule, where the aryl group content is 40 mol % or more;

(C) a curable linear or branched organopolysiloxane that includes at least one aryl group per molecule, where the aryl group content is less than 40 mol %;

(D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit (Ar represents an aryl group) per molecule or that have an aryl group content of 20 mol % or less;

(E) an organohydrogenpolysiloxane having at least 2 silicon atom-bonded hydrogen atoms per molecule, that is different from component (D); and (F) a curing catalyst, wherein the content of component (A) is 5% by mass or more, based on the total mass of the curable hot-melt silicone composition, and the mass ratio of the content of component (C) relative to the content of component (D) is less than 5.0.

The components of the curable hot-melt silicone composition of the present invention are described in detail below.

(A) Resinous Alkenyl Group-Containing Organopolysiloxane Including at Least Two Alkenyl Groups and at Least One Aryl Group Per Molecule, where the Aryl Group Content is 40 Mol % or More Component (A) is a curable resinous organopolysiloxane having at least two alkenyl groups and at least one aryl group per molecule. The curable hot-melt silicone composition according to the present invention may comprise one type of alkenyl group-containing resinous organopolysiloxane (A), or may comprise two or more types of alkenyl group-containing resinous organopolysiloxanes (A).

The molecular structure of component (A) is resinous. In the present specification, the term "resinous" means having a branched structure or a 3D network structure in the molecular structure. The resinous alkenyl group-containing organopolysiloxane of component (A) preferably comprises a siloxane unit (T unit) represented by $RSiO_{3/2}$ and a siloxane unit (D unit) represented by $R_2SiO_{2/2}$, and more preferably comprises only D units and T units. The structure of the resinous alkenyl group-containing organopolysiloxane of component (A) may or may not, and preferably does not, contain siloxane units (M units) represented by $SiO_{1/2}$. Component (A) also may or may not, and preferably does not, include a siloxane unit (Q unit) represented by $SiO_{4/2}$. In the present specification, R in the siloxane units represents a silicon atom-bonded organic functional group.

Examples of the alkenyl group in component (A) include C2-12 alkenyl groups such as vinyl, allyl, butenyl, pentenyl, hexenyl, heptenyl, octenyl, nonenyl, decenyl, undecenyl, and dodecenyl groups, and preferably vinyl groups.

Examples of silicon atom-bonded groups other than alkenyl groups in component (A) include halogen-substituted or unsubstituted monovalent hydrocarbon groups other than alkenyl groups, such as: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (A) may comprise a small quantity of hydroxyl groups or alkoxy groups such as methoxy or ethoxy groups to an extent that does not compromise the objectives of the present invention. Silicon atom-bonded groups other than alkenyl groups and aryl groups in component (A) are preferably C1-6 alkyl groups, particularly methyl groups, and C6-20 aryl groups, particularly phenyl groups. In one embodiment, the silicon atom-bonded groups other than alkenyl groups in component (A) do not include any epoxy group-containing organic groups.

In a preferred embodiment of the present invention, the resinous alkenyl group-containing organopolysiloxane of component (A) may be represented by the following average unit formula (I).

$$(R^1_2SiO_{2/2})_s(R^1SiO_{3/2})_t$$  Average unit formula (I):

In the formula, $R^1$ indicates halogen-substituted or unsubstituted monovalent hydrocarbon groups, which may be the same or different, except at least two $R^1$ per molecule are alkenyl groups, and at least one $R^1$ is an aryl group, where $0<s<1$, $0<t<1$, and $s+t=1$.

Examples of the optionally halogen-substituted monovalent hydrocarbon groups of $R^1$ in the above formula (I) include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^1$ may also comprise a small amount of hydroxyl groups or alkoxy groups such as methoxy and ethoxy groups to an extent that does not compromise the objectives of the present invention. $R^1$ is preferably selected from among C1-6 alkyl groups, particularly methyl, C2-6 alkenyl groups, particularly vinyl, or C6-20 aryl groups, particularly phenyl. In one embodiment, $R^1$ does not include any epoxy group-containing organic groups.

In formula (I), s is preferably in the range of $0.1 \leq s \leq 0.8$, more preferably in the range of $0.25 \leq s \leq 0.7$, and even more preferably in the range of $0.4 \leq s \leq 0.6$. In formula (I) above, t is preferably in the range of $0.1 \leq t \leq 0.75$, more preferably in the range of $0.25 \leq t \leq 0.6$, and in particular in the range of $0.35 \leq t \leq 0.55$.

The content of the alkenyl groups in all of the silicon atom-bonded organic groups of the resinous alkenyl group-containing organopolysiloxane of component (A) is not particularly limited, but may be, for example, 3 mol % or more, preferably 5 mol % or more, and more preferably 10 mol % or more of the total of the silicon atom-bonded organic groups, and 40 mol % or less, preferably 30 mol %, and more preferably 20 mol % or less of the total of the silicon atom-bonded organic groups. In the present specification, the alkenyl group content can be determined by means of analysis such as Fourier transform infrared spectrophotometry (FT-IR), nuclear magnetic resonance (NMR), or the titration method described below. In the present specification, numerical ranges can be established by combining any upper and lower limits of the numerical range.

A method for determining the amount of alkenyl groups in the components by means of a titration method is described. The alkenyl group content in the organopolysiloxane components can be accurately quantified by means of a titration method generally known as the Wijs method. The principles are described below. Firstly, the alkenyl groups in the organopolysiloxane starting material and iodine monochloride are subjected to an addition reaction as shown in formula (1). Next, according to the reaction shown in formula (2), an excess amount of iodine monochloride is reacted with potassium iodide, thereby freeing iodine. The freed iodine is subjected to titration with a sodium thiosulfate solution.

$$CH_2 = CH- + 2ICl \rightarrow CH_2I - CHCl - ICl \text{ (excess)}$$  Formula (1)

$$ICl + KI \rightarrow I_2 + KCl$$  Formula (2)

The alkenyl group amount in the component can be quantified from the difference between the amount of sodium thiosulfate required for titration and the titration amount of a separately prepare blank solution.

In a preferred embodiment of the invention, the resinous alkenyl group-containing organopolysiloxane of component (A) includes a silicon atom-bonded aryl group in a molecular-chain side chain, specifically, in a D unit or a T unit.

The resinous organopolysiloxane of component (A) has an aryl group content (mol % of aryl groups in all silicon atom-bonded organic functional groups) of at least 40% by mass. In a preferred embodiment, the resinous organopolysiloxane of component (A) has an aryl group content of at least 50 mol %, and more preferably at least 60 mol %, to usually no more than 90 mol %, preferably no more than 80 mol %, and more preferably no more than 75 mol %. The aryl group content can, for example, be determined by analysis such as Fourier transform infrared spectrophotometry (FT-IR) or nuclear magnetic resonance (NMR).

The weight-average molecular weight of the (A) alkenyl group-containing organopolysiloxane is, for example, within the range of, but is not particularly limited to, more than 1,000 to no more than 100,000. In the present specification, the number-average molecular weight can be determined by GPC.

The content of the resinous alkenyl group-containing organopolysiloxane of component (A) is 5% by mass or more, based on the total mass of the curable hot-melt silicone composition. In a preferred embodiment, the content of the resinous alkenyl group-containing organopolysiloxane of component (A) is 10% by mass or more, more preferably 15% by mass or more, and even more preferably 20% by mass or more, based on the total mass of the curable hot-melt silicone composition. The content of component (A) is preferably 90% by mass or less, more preferably 80% by mass or less, and even more preferably 75% by mass or less, based on the total mass of the curable silicone composition.

(B) Curable Linear Organopolysiloxane that Includes at Least One Aryl Group Per Molecule, where the Aryl Group Content is 40 Mol % or More Component (B) is a linear organopolysiloxane that includes at least one aryl group per molecule, where the aryl group content is 40 mol % or more. The term "curable" more specifically means hydrosilylation reaction curable.

Component (B) has at least one hydrosilylation curing reactive functional group per molecule. Examples of hydrosilylation curing reactive functional groups include, but are not particularly limited to, alkenyl groups or silicon atom-bonded hydrogen atoms. In a preferred embodiment, component (B) has at least two alkenyl groups per molecule as the hydrosilylation curing reactive functional groups. Examples of alkenyl groups, aryl groups, and other silicon atom-bonded groups in component (B) are the same as those for component (A).

In a preferred embodiment, the curable linear organopolysiloxane of component (B) includes at least one (AlArSiO$_{2/2}$) unit (Al represents an alkyl group, and Ar represents an aryl group) per molecule.

When component (B) is a linear alkenyl group-containing organopolysiloxane that contains an alkenyl group, it can preferably be represented by $$R^1_3SiO(R^2R^3SiO_{2/2})_nSiR^1_3 \quad \text{average structural formula (II):}$$

(in formula (II), $R^1$ are halogen-substituted or unsubstituted monovalent hydrocarbon groups, which may be the same or different, except at least two $R^1$ per molecule are alkenyl groups, $R^2$ is an alkyl group, $R^3$ is an aryl group, and n is 1 to 500).

In formula (II) above, the same groups as in formula (I) above can be used for the halogen-substituted or unsubstituted monovalent hydrocarbon groups of $R^1$.

Examples of alkyl groups represented by $R^2$ in formula (II) above include, but are not particularly limited to, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups, and preferably methyl groups.

Examples of aryl groups represented by $R^3$ in formula (II) above include, but are not particularly limited to, C6-20 aryl groups, such as phenyl, tolyl, xylyl, and naphthyl groups, and preferably phenyl groups.

In formula (II) above, n is preferably 2 to 300, more preferably 5 to 100, still more preferably 10 to 50, and particularly preferably 15 to 30.

In a preferred embodiment of the present invention, when the linear organopolysiloxane of component (B) contains an alkenyl group, it can be a linear organopolysiloxane that has alkenyl groups at both molecular terminals, where both ends of the molecular chain are capped with an alkenyl group. The linear organopolysiloxane of component (B) may or may not, but preferably does not, include an alkenyl group in a molecular-chain side chain (specifically, D unit).

When component (B) includes alkenyl groups, the alkenyl group content (mol % of alkenyl groups in all silicon atom-bonded organic functional groups) can be designed as desired, but should usually be 1 mol % or more, preferably 2 mol % or more, and more preferably 3 mol % or more, to 20 mol % or less, preferably 15 mol % or less, and more preferably 10 mol % or less.

The content of aryl groups (mol % of aryl groups in all silicon atom-bonded organic functional groups) in the linear organopolysiloxane component of component (B) is 40 mol % or more. The content of aryl groups in component (B) is usually 70 mol % or less, preferably 60 mol % or less, and more preferably 50 mol % or less.

The content of the linear organopolysiloxane of component (B) is not particularly limited, but is preferably 1% by mass or more, more preferably 2% by mass or more, and still more preferably 3% by mass or more, based on the total mass of the curable hot-melt silicone composition of the present invention. The content of component (B) is also preferably 30% by mass or less, more preferably 20% by mass or less, and even more preferably 15% by mass or less, based on the total mass of the curable silicone composition of the present invention.

(C) Curable Linear or Branched Organopolysiloxane that Includes at Least One Aryl Group Per Molecule, where the Aryl Group Content is Less than 40 Mol %

Component (C) is a linear or branched organopolysiloxane that includes at least one aryl group per molecule, where the aryl content is less than 40 mol %.

Component (C) has at least one hydrosilylation curing reactive functional group per molecule. Examples of hydrosilylation curing reactive functional groups include, but are not particularly limited to, alkenyl groups or silicon atom-bonded hydrogen atoms. In a preferred embodiment, component (C) has at least two alkenyl groups per molecule as the hydrosilylation curing reactive functional groups. Examples of alkenyl groups, aryl groups, and other silicon atom-bonded groups in component (C) are the same as those for component (A).

In a preferred embodiment, the curable linear or branched organopolysiloxane of component (C) comprises at least one (Al$_2$SiO$_{2/2}$) unit (Al represents an alkyl group) and at least one (Ar$_2$SiO$_{2/2}$) unit (Ar represents an aryl group) per molecule.

When component (C) is a linear alkenyl group-containing organopolysiloxane that contains an alkenyl group, it can preferably be represented by $$R^1_3SiO(R^2_2SiO_{2/2})_n(R^3_2SiO_{2/2})_M SiR^1_3 \quad \text{average structural formula (III-1):}$$

(in formula (III-1), $R^1$ are halogen-substituted or unsubstituted monovalent hydrocarbon groups, which may be the same or different, except at least two $R^1$ per molecule are alkenyl groups, $R^2$ is an alkyl group, $R^3$ is an aryl group, n is 1 to 500, and m is 1 to 500).

In formula (III-1) above, the same groups as in formula (I) above can be used for the halogen-substituted or unsubstituted monovalent hydrocarbon groups of $R^1$.

In formula (III-1) above, the same groups as in formula (II) above can be used for the alkyl groups represented by $R^2$ and the aryl groups represented by $R^3$.

In formula (III-1) above, n is preferably 2 to 300, more preferably 5 to 200, still more preferably 10 to 100, and particularly preferably 30 to 80. In formula (III-1) above, m is preferably 2 to 300, more preferably 5 to 100, still more preferably 10 to 75, and particularly preferably 15 to 50.

In a preferred embodiment of the present invention, when a linear organopolysiloxane serving as component (C) contains an alkenyl group, it can be a linear organopolysiloxane that has alkenyl groups at both molecular terminals, where both ends of the molecular chain are capped with an alkenyl group. Linear organopolysiloxanes serving as component (C) may or may not, but preferably do not, include an alkenyl group in a molecular-chain side chain (specifically, D unit).

When component (C) is a branched alkenyl group-containing organopolysiloxane that contains an alkenyl group, it may or may not, and preferably does not, contain siloxane units (D units) represented by $R_2SiO_{2/2}$. Thus, in a preferred embodiment, the branched alkenyl group-containing organopolysiloxane serving as component (C) comprises only M units and T units.

In a preferred embodiment, when component (C) is a branched alkenyl group-containing organopolysiloxane, it will include alkenyl groups in the molecular terminals (specifically, M units). Branched organopolysiloxanes serving as component (C) may or may not, but preferably do not, include an alkenyl group in a molecular-chain side chain (specifically, D unit or T unit).

In a preferred embodiment, when component (C) is a branched alkenyl group-containing organopolysiloxane, it contains an aryl group in a molecular-chain side chain (specifically, D unit and/or T unit). Branched organopolysiloxanes serving as component (C) may or may not, but preferably do not, include aryl groups in the molecular chain terminals (specifically, M units).

Thus, in a preferred embodiment, when component (C) is a branched alkenyl group-containing organopolysiloxane that contains an alkenyl group, it can be represented by $$(R^1_3SIO)_a(R^2SiO_{3/2})_b(R^3SiO_{3/2})_c \quad \text{average structural formula (III-2):}$$

(in formula (III-2), $R^1$ are halogen-substituted or unsubstituted monovalent hydrocarbon groups, which may be the same or different, except at least two $R^1$ per molecule are alkenyl groups, $R^2$ is an alkyl group, $R^3$ is an aryl group, $0<a<1$, $0\leq b<1$, $0<c<1$, and $a+b+c=1$).

In formula (III-2) above, the same groups as in formula (I) above can be used for the halogen-substituted or unsubstituted monovalent hydrocarbon groups of $R^1$. In formula (III-2) above, the same groups as in formula (II) above can be used for the alkyl groups represented by $R^2$ and the aryl groups represented by $R^3$.

In formula (III-2), a is preferably in the range of $0.05\leq a\leq 0.5$, more preferably in the range of $0.1\leq a\leq 0.4$, and even more preferably in the range of $0.15\leq a\leq 0.3$. In formula (III-2), b is preferably in the range of $0.2\leq b\leq 0.8$, more preferably in the range of $0.3\leq b\leq 0.7$, and even more preferably in the range of $0.4\leq b\leq 0.6$. In formula (III-2), c is preferably in the range of $0.05\leq c\leq 0.5$, more preferably in the range of $0.1\leq c\leq 0.4$, and even more preferably in the range of $0.15\leq c\leq 0.3$.

When component (C) includes alkenyl groups, the alkenyl group content (mol % of alkenyl groups in all silicon atom-bonded organic functional groups) can be designed as desired, but should usually be 0.1 mol % or more, preferably 0.5 mol % or more, and more preferably 0.8 mol % or more, to 10 mol % or less, and preferably 8 mol % or less.

The content of aryl groups (mol % of aryl groups in all silicon atom-bonded organic functional groups) in the linear or branched organopolysiloxane component of component (C) is less than 40 mol %. The content of aryl groups in component (C) is usually 5 mol % or more, may preferably be 10 mol % or more, and can be 35 mol % or less.

When component (C) is a linear organopolysiloxane, the content is not particularly limited, but is preferably 1% by mass or more, more preferably 2% by mass or more, and still more preferably 3% by mass or more, based on the total mass of the curable hot-melt silicone composition of the present invention. The content of the linear organopolysiloxane of component (C) is also preferably 20% by mass or less, more preferably 15% by mass or less, and even more preferably 10% by mass or less, based on the total mass of the curable hot-melt silicone composition of the present invention.

When component (C) is a branched organopolysiloxane, the content is not particularly limited, but is preferably 5% by mass or more, more preferably 10% by mass or more, and still more preferably 20% by mass or more, based on the total mass of the curable hot-melt silicone composition of the present invention. The content of the branched organopolysiloxane of component (C) is also preferably 50% by mass or less, more preferably 45% by mass or less, and even more preferably 40% by mass or less, based on the total mass of the curable hot-melt silicone composition of the present invention.

The content of component (C) is not particularly limited, but is preferably 1% by mass or more, more preferably 2% by mass or more, and still more preferably 3% by mass or more, based on the total mass of the curable hot-melt silicone composition of the present invention. The content of component (C) is also preferably 50% by mass or less, more preferably 45% by mass or less, and even more preferably 40% by mass or less, based on the total mass of the curable hot-melt silicone composition of the present invention.

In a preferred embodiment of the present invention, the curable hot-melt silicone composition of the present invention comprises components (B) and (C) in an amount such that the ratio of the content (mass) of component (B) to the content (mass) of component (C) is 5:1 to 1:5, preferably 4:1 to 1:4, and more preferably 3:1 to 1:3.

(D) Silicone Reactive Compatibilizer

The present invention comprises, as component (D), a silicone reactive compatibilizer for improving the compatibility of the organopolysiloxanes of components (A) through (C). The curable hot-melt silicone composition may contain one type of silicone reactive compatibilizer (D), or a combination of two or more types of silicone reactive compatibilizers (D).

The silicone reactive compatibilizer (D) is a silicone reactive organopolysiloxane having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit (Ar represents an aryl group) per molecule or that have an aryl group content of 20 mol % or less. The term "silicone reactive" specifically means hydrosilylation curing reactable.

The silicone reactive compatibilizer (D) preferably has a number-average molecular weight of 900 or less, and more preferably a number-average molecular weight of 800 or less. The lower limit of the number-average molecular weight of component (D) is not particularly limited but is usually 100 or more. In the present specification, the number-average molecular weight can be determined by GPC.

Silicone reactive cyclic organopolysiloxanes serving as component (D-1) are preferably cyclic alkenyl group-containing organopolysiloxane that have at least two alkenyl groups per molecule.

Cyclic organopolysiloxanes serving as component (D-1) can preferably be represented by average structural formula (IV-a): $(R^6{}_2SiO)_n$ (in formula (IV-a), $R^6$ are hydrogen atoms, or halogen-substituted or unsubstituted monovalent hydrocarbon groups, which may be the same or different, and n is a number resulting in a number-average molecular weight of 1000 or less).

In formula (IV-a) above, the same groups for $R^1$ in formula (I) above can be used for the halogen-substituted or unsubstituted monovalent hydrocarbon groups of $R^6$. In a preferred embodiment, at least two $R^6$ in formula (IV-a) above represent alkenyl groups.

In formula (IV-a) above, n is, for example 4 to 10, preferably 4 to 8, and more preferably 4 to 6.

In one embodiment, when component (D-1) includes alkenyl groups, the alkenyl group content (mol % of alkenyl groups in all silicon atom-bonded organic functional groups) can be designed as desired, but should usually be 10 mol % or more, preferably 30 mol % or more, and more preferably 45 mol % or more, to 80 mol % or less, preferably 70 mol % or less, and more preferably 60 mol % or less.

When the curable hot-melt silicone composition of the present invention comprises a cyclic organopolysiloxane (D-1), the content thereof is not particularly limited, but is, for example, 0.05% by mass or more, and more preferably 0.1% by mass or more, and is usually 10% by mass or less, preferably 5% by mass or less, and more preferably 3% by mass or less, based on the total mass of the curable hot-melt silicone composition of the present invention.

Silicone reactive MQ resins serving as component (D-2) are preferably alkenyl group-containing MQ resins having at least two alkenyl groups per molecule. MQ resins are organopolysiloxanes consisting only of siloxane units (M units) represented by $SiO_{1/2}$ and siloxane units (Q units) represented by $SiO_{4/2}$.

MQ resins serving as component (D-2) can preferably be represented by the following average unit formula (IV-b).

$$(R^6{}_3SiO_{1/2})_s(SiO_{4/2})_t \qquad \text{Average unit formula (Iv-b):}$$

In the formula, $R^6$ are hydrogen atoms, or halogen-substituted or unsubstituted monovalent hydrocarbon groups, which may be the same or different, 0<s<1, 0<t<1, and s+t=1.

In formula (IV-b) above, the same groups for $R^1$ in formula (I) above can be used for the halogen-substituted or unsubstituted monovalent hydrocarbon groups of $R^6$. At least two $R^6$ per group are preferably alkenyl groups.

In formula (VI-b), s is preferably in the range of 0.3≤s≤0.95, more preferably in the range of 0.5≤s≤0.9, and even more preferably in the range of 0.7≤s≤0.85. In formula (VI-b) above, t is preferably in the range of 0.05≤t≤0.5, more preferably in the range of 0.1≤t≤0.4, and in particular in the range of 0.15≤t≤0.3.

In one embodiment, when the MQ resin serving as component (D-2) includes alkenyl groups, the alkenyl group content (mol % of alkenyl groups in all silicon atom-bonded organic functional groups of the MQ resin) can be designed as desired, but should usually be 10 mol % or more, preferably 20 mol % or more, and more preferably 30 mol % or more, to 50 mol % or less, and preferably 40 mol % or less.

When the curable hot-melt silicone composition of the present invention comprises a MQ resin (D-2), the content thereof is not particularly limited, but is, for example, 0.5% by mass or more, and more preferably 1% by mass or more, and is usually 10% by mass or less, preferably 5% by mass or less, and more preferably 3% by mass or less, based on the total mass of the curable hot-melt silicone composition of the present invention.

Silicone reactive organopolysiloxanes serving as component (D-3) are resinous organopolysiloxanes comprising at least one $(ArSiO_{3/2})$ unit (Ar represents an aryl group) per molecule or organopolysiloxanes having an aryl group content of 20 mol % or less. Silicone reactive organopolysiloxanes serving as component (D-3) are preferably organopolysiloxanes comprising at least two silicon atom-bonded hydrogen atoms per molecule.

Organopolysiloxanes serving as component (D-3) preferably comprising siloxane units (M units) represented by $R^3SiO_{1/2}$. Organopolysiloxanes serving as component (D-3) may or may not, and preferably do not, include siloxane units (D units) represented by $R^2SiO_{2/2}$. Organopolysiloxanes serving as component (D-3) may or may not, and preferably do not, include siloxane units (Q units) represented by $SiO_{4/2}$.

Thus, when an organopolysiloxane serving as component (D-3) is a resinous organopolysiloxane, it is preferably represented by the following average unit formula (IV-c).

$$(R^6{}_3SiO_{1/2})_p(ArSiO_{3/2})_q \qquad \text{Average unit formula (IV-c):}$$

(In the formula, $R^6$ are hydrogen atoms, or halogen-substituted or unsubstituted monovalent hydrocarbon groups, which may be the same or different, Ar represents an aryl group, 0<p<1, 0<q<1, and p+q=1.)

In formula (IV-c) above, the same groups for $R^1$ in formula (I) above can be used for the halogen-substituted or unsubstituted monovalent hydrocarbon groups of $R^6$. At least two $R^6$ per molecule are preferably hydrogen atoms.

In formula (IV-c), p is preferably in the range of 0.3≤p≤0.9, more preferably in the range of 0.4≤p≤0.8, and even more preferably in the range of 0.5≤p≤0.7. In formula (IV-c) above, q is preferably in the range of 0.1≤q≤0.7, more preferably in the range of 0.2≤q≤0.6, and in particular in the range of 0.3≤q≤0.5.

In one embodiment, the content of aryl groups in component (D-3) (mol % of aryl groups in all silicon atom-bonded organic functional groups) is 20 mol % or less. In another embodiment, the content of aryl groups in component (D-3) is less than 25 mol %. The content of aryl groups in component (D-3) is usually 5 mol % or more, preferably 10 mol % or more, and more preferably 15 mol % or more.

When the curable hot-melt silicone composition of the present invention comprises an organopolysiloxane serving as component (D-3), the content thereof is not particularly limited, but is, for example, 0.5% by mass or more, and more preferably 1% by mass or more, and is usually 10% by mass or less, preferably 5% by mass or less, and more preferably 3% by mass or less, based on the total mass of the curable hot-melt silicone composition of the present invention.

The content of the silicon reactive compatibilizer of component (D) is not particularly limited, but is preferably 0.5% by mass or more, more preferably 1% by mass or more, and still more preferably 1.5% by mass or more, based on the total mass of the curable hot-melt silicone composition of the present invention. The content of component (D) is also preferably 20% by mass or less, more preferably 15% by mass or less, and even more preferably 10% by mass or less, based on the total mass of the curable hot-melt silicone composition of the present invention.

In the interests of the compatibility of components (A) through (C) in the curable hot-melt silicone composition of the present invention, the mass ratio of the content of component (C) relative to the content of component (D) is less than 5.0. For example, the mass ratio of the content of component (C) relative to the content of component (D) can range from 0.1 to 4.9, and preferably from 0.3 to 4.8.

(E) Organohydrogenpolysiloxane Having at Least Two Silicon Atom-Bonded Hydrogen Atoms Per Molecule Component (E), which acts as a cross linking agent for the curable silicone composition by way of a hydrosilylation curing reaction, is an organohydrogenpolysiloxane having at least two silicon atom-bonded hydrogen atoms per molecule, that is different from component (D). The curable hot-melt silicone composition according to the present invention may comprise one type of (E) organohydrogenpolysiloxane, or may comprise two or more types of (E) organohydrogenpolysiloxanes.

Examples of the molecular structure of the component (E) are linear, linear with some branching, branched, resinous, cyclic, and 3D network structures. Component (E) may be one organohydrogenpolysiloxane having such a molecular structure, or a mixture of two or more such organohydrogenpolysiloxanes. The curable silicone composition of the present invention preferably comprises a linear organohydrogenpolysiloxane as component (E).

Examples of silicon atom-bonded groups other than alkenyl groups in component (E) include halogen-substituted or unsubstituted monovalent hydrocarbon groups other than alkenyl groups, such as: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (E) may have a small quantity of hydroxyl groups or alkoxy groups such as methoxy or ethoxy groups, provided that the objectives of the present invention are not thereby compromised. Silicon atom-bonded groups other than silicon atom-bonded hydrogen atoms in component (E) are preferably selected from among C1-6 alkyl groups, particularly methyl groups, and C6-20 aryl groups, particularly phenyl groups.

In one embodiment of the present invention, component (E) is a linear organohydrogenpolysiloxane, which can be represented by the following average structural formula (V).

$$R^4{}_3SiO(R^4{}_2SiO_{2/2})_nSiR^4{}_3 \qquad \text{Average structural formula (V):}$$

(In formula (V), $R^4$ are hydrogen atoms, or halogen-substituted or unsubstituted monovalent hydrocarbon groups other than alkenyl groups, which may be the same or different, except at least two $R^4$ per molecule are hydrogen atoms, and n is 1 to 100.)

Examples of halogen-substituted or unsubstituted monovalent hydrocarbon groups other than alkenyl groups of $R^4$ in formula (V) include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. $R^4$ may also comprise a small amount of hydroxyl groups or alkoxy groups such as methoxy and ethoxy groups to an extent that does not compromise the objectives of the present invention. $R^4$ is preferably a C1-6 alkyl group, particularly a methyl group.

In formula (V), n is preferably 1 to 50, and more preferably 1 to 20.

In a preferred embodiment of the present invention, the linear organohydrogenpolysiloxane of component (E) has a silicon atom-bonded hydrogen atom at both terminals of the molecular chain. The linear organohydrogenpolysiloxane of component (E) has a silicon atom-bonded hydrogen atom in the M unit, and may or may not, but preferably does not, have a silicon atom-bonded hydrogen atom in the D unit.

In one embodiment, an aryl group is included in the silicon atom-bonded hydroxyl organic functional groups of component (E). The aryl group content of component (E) (mol % of aryl groups in all silicon atom-bonded organic functional groups) can be designed as desired, but should usually be 5 mol % or more, preferably 10 mol % or more, and more preferably 15 mol % or more, to 50 mol % or less, preferably 40 mol % or less, and more preferably 30 mol % or less.

The content of component (E) is not particularly limited, but is preferably 5% by mass or more, more preferably 10% by mass or more, and even more preferably 15% by mass or more, based on the total mass of the curable hot-melt silicone composition. In a preferred embodiment, component (E) can be included in an amount of 50% by mass or less, preferably 40% by mass or less, and more preferably 30% by mass or less, based on the total mass of the curable hot-melt silicone composition.

In one embodiment of the present invention, component (E) can be included in an amount such that the ratio of silicon atom-bonded hydrogen atoms relative to silicon atom-bonded alkenyl groups in the organopolysiloxane components is 0.5 mols or more, preferably 0.7 mols or more, more preferably 0.8 mols or more of silicon atom-bonded hydrogen atoms per mol of silicon atom-bonded alkenyl groups in the curable hot-melt silicone composition, and can also be, for example, 2 mols or less, preferably 1.5 mols or less, and more preferably 1.3 mols or less of silicon atom-bonded hydrogen atoms per mol of silicon atom-bonded alkenyl groups in the curable hot-melt silicone composition.

(F) Curing Catalyst

The curing catalyst of component (F) is a hydrosilylation reaction curing catalyst, which is a catalyst for promoting curing of the curable silicone composition of the present invention. Examples of component (F) include platinum-based catalysts such as chloroplatinic acid, alcohol solutions of chloroplatinic acid, platinum-olefin complexes, platinum-and-1,3-divinyl-1,1,3,3-tetramethyldisiloxane complexes, and platinum-supporting powders; palladium-based catalysts such as tetrakis(triphenylphosphine)palladium, and mixtures of triphenylphosphine and palladium black; and rhodium-based catalysts; but platinum-based catalysts are particularly preferred.

Component (F) is blended in a catalytic amount; more specifically, when a platinum-based catalyst is used as component (F), the amount of platinum atoms is preferably 0.01 ppm or more, more preferably 0.1 ppm or more, and even more preferably 1 ppm or more relative to the total mass of the curable silicone composition of the present invention, and the amount of platinum atoms can also preferably be 20 ppm or less, more preferably 15 ppm or less, even more preferably 10 ppm or less, and particularly preferably 7 ppm or less relative to the total mass of the curable silicone composition of the present invention.

(Other Organopolysiloxane Components)

The curable hot-melt silicone composition according to the present invention may contain other organopolysiloxanes such as an epoxy group-containing organopolysiloxane additive. The epoxy group-containing organopolysiloxanes can preferably be tackifiers. Epoxy group-containing organopolysiloxanes also differ from component (A) in that epoxy group-containing organic groups are included in at least the silicon atom-bonded organic groups.

Examples of the molecular structure of epoxy group-containing organopolysiloxanes are linear, linear with some branching, branched, cyclic, resinous, and 3D network structures, where resinous epoxy-group containing organopolysiloxanes are preferred. The curable silicone composition according to the present invention may comprise one type of epoxy group-containing organopolysiloxane, or may comprise combinations of two or more types of epoxy group-containing organopolysiloxanes.

Epoxy group-containing organopolysiloxanes can preferably contain alkenyl groups, examples of which include C2-12 alkenyl groups such as vinyl, allyl, butenyl, pentenyl, hexenyl, heptenyl, octenyl, nonenyl, decenyl, undecenyl, and dodecenyl groups, preferably vinyl groups, and can also contain epoxy group-containing organic groups, examples of which include: glycidoxy alkyl groups such as 2-glycidoxyethyl, 3-glycidoxypropyl and 4-glycidoxybutyl groups; epoxycyclohexylalkyl groups such as 2-(3,4-epoxycyclohexyl)-ethyl and 3-(3,4-epoxycyclohexyl)-propyl groups; and epoxyalkyl groups such as 3,4-epoxybutyl and 7,8-epoxyoctyl groups; glycidoxyalkyl groups are preferred, particularly 3-glycidoxypropyl groups.

Examples of silicon atom-bonded groups other than alkenyl groups and epoxy group-containing organic groups in epoxy group-containing organopolysiloxanes include halogen-substituted or unsubstituted monovalent hydrocarbon groups other than alkenyl groups and epoxy group-containing organic groups, such as: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms; C1-12 alkyl groups are preferred, particularly methyl groups.

Resinous epoxy group-containing organopolysiloxanes are preferably represented by the following average unit formula (VI): $(R^5{}_3SiO_{1/2})_f(R^5{}_2SiO_{2/2})_g(R^5SiO_{3/2})_h(SiO_{4/2})_i$ $(XO_{1/2})_j$ {in formula (VI), $R^5$ are each independently halogen-substituted or unsubstituted monovalent hydrocarbon groups, except at least two $R^5$ are alkenyl groups, and at least one $R^5$ is an epoxy group-containing organic group, X is a hydrogen atom or an alkyl group, $0 \le f < 1$, $0 \le g < 1$; $0 \le h < 0.9$, $0 \le i < 0.5$, $0 \le j < 0.4$, $f+g+j+i+j=1.0$, and $h+i > 0$}.

In formula (VI) above, examples of halogen-substituted or unsubstituted monovalent hydrocarbon groups represented by $R^5$ include the above-mentioned alkenyl groups, epoxy group-containing organic groups, and monovalent hydrocarbon groups other than these. In formula (VI) above, X is a hydrogen atom or an alkyl group. Preferred examples of alkyl groups represented by X include C1-3 alkyl groups, specifically methyl, ethyl, and propyl groups.

In formula (VI) above, f is preferably in the range of $0.05 \le f \le 0.5$, more preferably in the range of $0.05 \le f \le 0.4$, and even more preferably in the range of $0.1 \le f \le 0.3$. In formula (VI) above, g is preferably in the range of $0.1 \le g \le 0.6$, more preferably in the range of $0.15 \le g \le 0.5$, and in particular in the range of $0.2 \le g \le 0.4$. In formula (VI) above, h is preferably in the range of $0.2 \le h \le 0.8$, more preferably in the range of $0.3 \le h \le 0.7$, and particularly in the range of $0.4 \le h \le 0.6$. In formula (VI) above, i is preferably in the range of $0 \le i \le 0.4$, more preferably in the range of $0 \le i \le 0.25$, and particularly in the range of $0 \le i \le 0.1$. In formula (VI) above, j is preferably in the range of $0.05 \le j \le 0.5$, more preferably in the range of $0.1 \le j \le 0.4$, and in particular in the range of $0.15 \le j \le 0.3$.

In a preferred embodiment of the present invention, resinous epoxy group-containing organopolysiloxanes are such that h in Formula (VI) above is greater than 0, specifically, include siloxane units represented by $SiO_{3/2}$ (T units). The resinous epoxy group-containing organopolysiloxanes may or may not, and preferably do not, include siloxane units represented by $SiO_{4/2}$ (Q units).

In a preferred embodiment of the present invention, the resinous epoxy group-containing organopolysiloxane has epoxy group-containing organic groups in the form of molecular side-chain pendant groups. Epoxy group-containing organopolysiloxanes preferably have epoxy group-containing organic groups in siloxane units (D units) represented by $SiO_{2/2}$.

The amount of epoxy group-containing organic groups in all silicon atom-bonded organic groups in the epoxy group-containing organopolysiloxane is not particularly limited, but is preferably 5 mol % or more, more preferably 10 mol % or more, and even more preferably 15 mol % or more, to 40 mol % or less, and preferably 30 mol % or less. The amount of the epoxy group-containing organic groups can, for example, be determined by analysis such as Fourier transform infrared spectrophotometry (FT-IR) or nuclear magnetic resonance (NMR).

The number-average molecular weight of the epoxy group-containing organopolysiloxane is not particularly limited, but can range from 1,000 to 10,000.

The content of epoxy group-containing organopolysiloxanes is not particularly limited but can be included in an amount of preferably 0.01% by mass or more, more preferably 0.1% by mass % or more, and still more preferably 0.5% by mass or more based on the total mass of the curable hot-melt silicone composition of the present invention, and can also be included in an amount of 20% by mass or less, more preferably 10% by mass or less, and even more preferably 5% by mass or less based on the total mass of the curable hot-melt silicone composition of the present invention.

(Other Components)

Optional components may be blended in the curable silicone composition of the present invention to an extent that does not compromise the objectives of the present invention. Examples of optional components include acetylene compounds, organic phosphorus compounds, vinyl group-containing siloxane compounds; inorganic fillers such as crushed quartz, silica, magnesium carbonate, diatomaceous earth, and inorganic fillers obtained by subjecting the surface of such inorganic fillers to hydrophobic treatment with an organosilicon compound; surface treatment agents, hydrosilylation reaction inhibitors, tackifiers, agents that confer heat resistance, agents that confer cold resistance, agents that confer flame retardance, agents that confer thixotropic properties, phosphors, and solvents. Such optional components are usually added in an amount of 0.001 to 20% by mass of the total composition of the present invention.

Hydrosilylation reaction inhibitors are components for suppressing the hydrosilylation reaction of the curable silicone composition. Examples of such curing reaction inhibitors include: alkyne alcohols such as 2-methyl-3-butyn-2-ol, 3,5-dimethyl-1-hexyn-3-ol, 2-phenyl-3-butyn-2-ol, 1-ethynyl-1-cyclohexanol, and 1-ethynyl-2-cyclohexanol; enyne compounds such as 3-methyl-3-penten-1-yne, 3,5-dimethyl-3-hexen-1-yne; alkenyl group-containing low-molecular weight siloxanes such as tetramethyltetravinylcyclotetrasiloxane and tetramethyltetrahexenylcyclotetrasiloxane; and alkynyloxysilanes such as methyl-tris(1,1-dimethylpropynyloxy) silane, vinyl-tris(1,1-dimethylpropynyloxy) silane, and methyl-tris-(3-methyl-1-butyn-3-oxy)silane. Preferably, the hydrosilylation reaction inhibitor is selected from alkyne alcohols, and is particularly preferably 1-ethynyl-1-cyclohexanol. The reaction inhibitor is usually added in an amount of 0.001 to 5 mass % of the total composition of the present invention.

The curable hot-melt silicone composition according to the present invention can be cured to form a cured product having excellent transparency. For example, a cured product of the curable silicone composition of the present invention can have a light transmittance greater than 95% at a wavelength in the range of 400 nm to 700 nm. The light transmittance of the cured product of the curable silicone composition can be determined, for example, by measuring the cured product having an optical path length of 1 mm using a spectrophotometer.

The curable hot-melt silicone composition according to the present invention has a high refractive index. For example, the refractive index of the curable silicone composition of the present invention at 25° C. and 589 nm is preferably greater than 1.53, and more preferably 1.55 or more, as determined using an Abbe refractometer.

The curable silicone composition of the present invention can be prepared by mixing the components. The method for mixing the components may be a conventionally known method but is not particularly limited; for example, the composition can be prepared using a mixing device. Examples of such mixing devices include, but are not particularly limited to, single- and twin-screw continuous mixers, double roller mixers, Ross mixers, Hobart mixers, dental mixers, planetary mixers, kneader mixers, and Henschel mixers.

[Sealing Materials and Hot-Melt Adhesives]

The present invention also relates to a semiconductor sealing material or hot-melt adhesive utilizing the curable hot-melt silicone composition of the present invention. The configuration of the sealing material or hot-melt adhesive of the present invention is not particularly limited, but is preferably in the form of a film or sheet, and can be provided in the form of a film or a laminated film for encapsulating semiconductors. Examples of semiconductors that can be sealed with the sealing material of the present invention include, but are not particularly limited to, semiconductors made of SiC or GaN, for example, and particularly optical semiconductors such as power semiconductors or light emitting diodes.

[Optical Semiconductor Element]

The present invention also relates to an optical semiconductor element comprising the sealing material of the present invention. Examples of optical semiconductor elements include light-emitting diodes (LEDs), semiconductor lasers, photodiodes, phototransistors, and light emitters and light receivers for solid-state imaging and photocouplers, where light-emitting diodes (LEDs) are particularly preferred.

Light-emitting diodes (LEDs) produce emitted light from the upper, lower, left and right sides of the optical semiconductor element, so it is undesirable for components of the light-emitting diode (LED) to absorb light, and materials having high light transmittance or high reflectance are preferred for such components. Consequently, a substrate on which the optical semiconductor element is mounted also preferably comprises a material having high light transmittance or high reflectance. Examples of the substrate on which the optical semiconductor element is mounted include: conductive metals such as silver, gold and copper; non-conductive metals such as aluminum and nickel; thermoplastic resins mixed with white pigments, such as PPA and LCP; thermosetting resins containing white pigments, such as epoxy resins, BT resins, polyimide resins and silicone resins; and ceramics such as alumina and alumina nitride.

Specific embodiments of the present invention are presented below.

Embodiment 1: A curable hot-melt silicone composition, comprising:

(A) a resinous alkenyl group-containing organopolysiloxane that includes at least two alkenyl groups and at least one aryl group per molecule, where the aryl group content is 40 mol % or more;

(B) a curable linear organopolysiloxane that includes at least one aryl group per molecule, where the aryl group content is 40 mol % or more;

(C) a curable linear or branched organopolysiloxane that includes at least one aryl group per molecule, where the aryl group content is less than 40 mol %;

(D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit (Ar represents an aryl group) per molecule or that have an aryl group content of 20 mol % or less;

(E) an organohydrogenpolysiloxane having at least 2 silicon atom-bonded hydrogen atoms per molecule, that is different from component (D); and (F) a curing catalyst, wherein the content of component (A) is 5% by mass or more, based on the total mass of the curable hot-melt silicone composition, and the mass ratio of the content of component (C) relative to the content of component (D) is less than 5.0.

Embodiment 2: The curable hot-melt silicone composition described in Embodiment 1, wherein the resinous alkenyl group-containing organopolysiloxane of component (A) comprises a siloxane unit (T unit) represented by $RSiO_{3/2}$ and a siloxane unit (D unit) represented by $R_2SiO_{2/2}$.

Embodiment 3: The curable hot-melt silicone composition described in Embodiment 1 or 2, wherein the resinous alkenyl group-containing organopolysiloxane of component (A) is represented by the following average unit formula (I):

$(R^1{}_2SiO_{2/2})$ s $(R^1SiO_{3/2})_t$ (in the formula, $R^1$ indicates halogen-substituted or unsubstituted monovalent hydrocarbon groups, which may be the same or different, except at least two $R^1$ per molecule are alkenyl groups, $0<s<1$, $0<t<1$, and $s+t=1$).

Embodiment 4: The curable hot-melt silicone composition described in any of Embodiments 1 through 3, wherein the curable linear organopolysiloxane of component (B) includes at least one $(AlArSiO_{2/2})$ unit (Al represents an alkyl group, and Ar represents an aryl group) per molecule.

Embodiment 5: The curable hot-melt silicone composition described in any of Embodiments 1 through 4, wherein component (C) comprises a curable linear organopolysiloxane having at least one $(Al_2SiO_{2/2})$ unit (Al represents an alkyl group) and at least one $(Ar_2SiO_{2/2})$ unit (Ar represents an aryl group) per molecule.

Embodiment 6: The curable hot-melt silicon composition described in any of Embodiments 1 through 5, wherein the organopolysiloxane of component (D-3) is a resinous organopolysiloxane represented by average unit formula (IV-c):

Iv-c: $(R^6{}_3SiO_{1/2})_p(ArSiO_{3/2})_q$ (in the formula, $R^6$ are hydrogen atoms, or halogen-substituted or unsubstituted monovalent hydrocarbon groups, which may be the same or different, Ar represents an aryl group, $0<p<1.0$, $0<q<1.0$, and $p+q=1.0$).

Embodiment 7: A sealing material or hot-melt adhesive, comprising the curable hot-melt silicone composition described in any of Embodiments 1 through 7.

Embodiment 8: An optical semiconductor device that has been sealed with the sealing material described in Embodiment 7.

Examples

The inventive curable hot-melt silicone composition is described in greater detail by means of the following examples and comparative examples.

Curable silicone compositions were prepared by mixing the components in the formulations (parts by mass) shown in the tables. It should be noted that, hereinbelow, Me denotes methyl, Vi denotes vinyl, Ph denotes phenyl, and Ep denotes 3-glycidoxypropyl. The structures of the organopolysiloxane components are also shown in a simplified manner in the table, and the functional groups other than Me in the M, D, or T unit are shown in parentheses. In addition, H/Vi indicates the molar ratio of the silicon atom-bonded hydrogen atoms (H) and the vinyl groups (Vi) in the organopolysiloxane components. In the tables, "(C)/(D) ratio" indicates the ratio of the content of component (C) relative to the content of component (D). In the specification of the present application, "unit formula" indicates a chemical formula that includes a siloxane unit represented by $(SiO_{x/2})$ (x is an integer of 1 to 4), and "structural formula" indicates a chemical formula that does not include any such siloxane units.

Component a: Resinous alkenyl group-containing organopolysiloxane represented by average unit formula $(ViMeSio_{2/2})_{25}(Ph_2SiO_{2/2})_{30}(PhSiO_{3/2})_{45}$ (phenyl group content per molecule: 68 mol %)

Component b: Linear alkenyl group-containing organopolysiloxane represented by average structural formula $Me_2ViSiO(MePhSiO)_{20}SiMe_2Vi$ (phenyl group content per molecule: 43 mol %)

Component c-1: Linear alkenyl group-containing organopolysiloxane represented by average structural formula $Me_2ViSiO(Me_2SiO)_{60}(Ph_2SiO)_{30}SiMe_2$ (phenyl group content per molecule: 32 mol %)

Component c-2: Branched alkenyl group-containing organopolysiloxane represented by average unit formula $(Me_3SiO_{1/2})_{14}(Me_2ViSiO_{1/2})_{11}(MeSiO_{3/2})_{53}$ $(PhSiO_{3/2})_{22}$ (phenyl group content per molecule: 15 mol %)

Component d-1: Resinous organohydrogenpolysiloxane represented by average unit formula $(HMe_2SiO_{1/2})_{60}$ $(PhSiO_{3/2})_{40}$ Component d-2: Alkenyl group-containing MQ resin represented by average structural formula $(ViMe_2SiO)_4Si$ Component d-3: Cyclic alkenyl group-containing organopolysiloxane represented by average structural formula $(ViMeSiO)_4$ Component d': MQ resin (weight-average molecular weight: 1600) represented by average unit formula $(HMe_2SiO_{1/2})_{62}(SiO_{4/2})_{38}$ Component e: Linear organohydrogenpolysiloxane represented by average structural formula $HMe_2SiO$ $(Ph_2SiO)SiHMe_2$ Component f: Complex of platinum and divinyltetramethyldisiloxane having a platinum concentration of 3.0% by mass Component g: 1-ethynyl-1-cyclohexanol Component h: Resinous epoxy group-containing organopolysiloxane represented by average unit formula $(ViMe_2SiO_{1/2})_{13}(EpMeSiO_{2/2})_{24}(PhSiO_{3/2})_{46}(OMe)_{17}$ (Light Transmittance)

The resulting curable hot-melt silicone composition was placed between two transparent glass sheets and was cured by being heated for 1 hour to 150° C. to prepare a test piece having an optical path length of 1 mm. The light transmittance of this test piece was measured at 25° C. using a self-recording spectrophotometer capable of measuring at any wavelength in the range of visible light (wavelengths of 400 nm to 700 nm). OK indicates a light transmittance greater than 95%, and NG indicates a light transmittance of ≤95%.

(Adhesion)

The resulting hot-melt silicone compositions were applied in the form of a sheet and heated for 5 to 30 minutes to 110° C. to prepare 1 mm thick cured products in the form of sheets. Probes were pressed at a pressure of 0.1 MPa against the surfaces of these hot-melt cured products, and the adhesion was assessed by determining the resistance when the products were peeled off at a speed of 200 mm/min. OK indicates an adhesion value of 0.1 MPa or less.

(Hot-Melt Properties)

The resulting hot-melt silicone compositions were applied in the form of a sheet and heated for 5 to 30 minutes to 100° C. to prepare 1 mm thick cured products in the form of sheets. The melt elastic modulus at 100° C. of these hot-melt cured products was determined using a viscoelastometer (MCR302, manufactured by Anton Paar), where OK indicates a value of 10,000 Pa or less.

[Die Shear Strength]

25 mm×75 mm aluminum boards were used as substrates, and four 10 mm×10 mm×1 mm aluminum chips were used as bonding chips. Round cured sheets of curable hot-melt silicone 8 mm in diameter were attached for each chip, the chips were placed thereon, and the chips were then bonded to the substrate via lamination at 100° C. and subsequent curing for 2 hours at 150° C. The shear die strength was determined using a bond tester (model number: SS-30WD; test mode: PH50 push; speed: 0.120 mm/sec). OK indicates a die shear strength greater than 10 MPa, and NG indicates a strength below 10 MPa.

(Refractive Index)

The refractive index of the resulting curable hot-melt silicone compositions at 25° C. and 589 nm was determined using an Abbe refractometer. The refractive index of the composition in Comparative Example 6 was 1.54, and the refractive index of the compositions in all other examples and comparative examples was 1.55.

TABLE 1

| Component | Example 1 | Example 2 | Example 3 | Example 4 | Example 5 | Example 6 | Example 7 |
|---|---|---|---|---|---|---|---|
| a $D(Vi)_{25}D(Ph_2)_{30}T(Ph)_{45}$ | 62.93 | 62.93 | 62.93 | 62.55 | 62.53 | 57.68 | 27.41 |
| b $M(Vi)D(Ph)_{20}M(Vi)$ | 8.88 | 8.88 | 8.88 | 4 | 6.2 | 8.4 | 12.08 |
| c-1 $M(Vi)D_{60}D(Ph_2)_{30}M(Vi)$ | 4.5 | 4.5 | 4.5 | 8.88 | 6.7 | 4.5 | — |
| c-2 $M14-M(Vi)11-T53-T(Ph)_{22}$ | | | | | | | 33.63 |
| d-1 $M(H)_{60}T(Ph)_{40}$ | 1.5 | — | 1.5 | 2.5 | 2.5 | 6 | 4 |
| d-2 $M(Vi)_4Q$ | — | — | 1.5 | 2.5 | 2.5 | 3 | — |
| d-3 $D(Vi)_4$ | 0.2 | 1.7 | 0.2 | 0.2 | 0.2 | 0.2 | 3 |
| e $M(H)D(Ph_2)M(H)$ | 20.97 | 20.97 | 20.97 | 20.85 | 20.85 | 19.22 | 17.36 |
| h $M(Vi)_{13}D(Ep)_{24}T(Ph_2)_{46}(OMe)_{17}$ | 1 | 1 | 1 | 1 | 1 | 1 | 2.5 |
| f Pt catalyst (Pt: ppm) | 5 | 5 | 5 | 5 | 5 | 5 | 5 |
| g | 0.02 | 0.02 | 0.02 | 0.02 | 0.02 | 0.02 | 0.02 |
| Total | 100 | 100 | 100 | 100 | 100 | 100 | 100 |
| H/Vi ratio | 1.2 | 0.9 | 1 | 0.9 | 0.9 | 0.9 | 0.9 |
| (C)/(D) ratio | 2.6 | 2.6 | 2.6 | 3.3 | 2.5 | 0.5 | 4.8 |
| Evaluation | | | | | | | |
| Light transmittance | OK | OK | OK | OK | OK | OK | OK |
| Adhesion | OK | OK | OK | OK | OK | OK | OK |
| Hot-melt properties | OK | OK | OK | OK | OK | OK | OK |
| Die shear strength | OK | OK | OK | OK | OK | OK | OK |

TABLE 2

| Component | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| a $D(Vi)_{25}D(Ph_2)_{30}T(Ph)_{45}$ | 62.93 | 64.05 | 62.93 | 62.93 | 64.05 | 62.55 | 59.55 |
| b $M(Vi)D(Ph)_{20}M(Vi)$ | 8.88 | 8.88 | 4.44 | 12.88 | 13.38 | 12.88 | 13.38 |
| c $M(Vi)D_{60}D(Ph_2)_{30}M(Vi)$ | 4.5 | 4.5 | 8.94 | | | | — |
| d-1 $M(H)_{60}T(Ph)_{40}$ | — | — | — | 2 | — | — | 3 |
| d-2 $M(Vi)_4Q$ | — | — | 1.5 | — | — | 2.5 | — |
| d-3 $D(Vi)_4$ | — | — | 0.2 | 0.2 | 0.2 | 0.2 | 1.2 |
| d' $M(H)_{62}Q_{38}$ | 1.5 | — | — | — | — | — | — |
| e $M(H)D(Ph_2)M(H)$ | 20.97 | 21.35 | 20.97 | 20.97 | 21.35 | 20.85 | 19.85 |
| h $M(Vi)_{13}D(Ep)_{24}T(Ph_2)_{46}(OMe)_{17}$ | 1 | 1 | 1 | 1 | 1 | 1 | 2.5 |
| f Pt catalyst (Pt: ppm) | 5 | 5 | 5 | 5 | 5 | 5 | 5 |
| g | 0.02 | 0.02 | 0.02 | 0.02 | 0.02 | 0.02 | 0.02 |
| Total | 100 | 100 | 100 | 100 | 100 | 100 | 100 |
| H/Vi ratio | 1.2 | 1 | 1 | 1.1 | 1.1 | 0.9 | 1.1 |
| (C)/(D) ratio | 22.5 | 22.5 | 5.3 | — | — | — | — |
| Evaluation | | | | | | | |
| Light transmittance | OK | NG | NG | OK | OK | OK | OK |
| Adhesion | NG | OK | OK | OK | NG | NG | NG |
| Hot-melt properties | OK | OK | OK | NG | OK | OK | OK |
| Die shear strength | OK | OK | OK | NG | OK | OK | OK |

TABLE 3

| Component | Comparative Example 8 | Comparative Example 9 | Comparative Example 10 | Comparative Example 11 | Comparative Example 12 | Comparative Example 13 |
|---|---|---|---|---|---|---|
| a $D(Vi)_{25}D(Ph_2)_{30}T(Ph)_{45}$ | 64.05 | 62.93 | 62.93 | 62.93 | 62.93 | 62.18 |
| b $M(Vi)D(Ph)_{20}M(Vi)$ | — | — | — | — | — | — |
| c $M(Vi)D_{60}D(Ph_2)_{30}M(Vi)$ | 13.38 | 13.38 | 13.38 | 13.38 | 13.38 | 13.38 |
| d-1 $M(H)_{60}T(Ph)_{40}$ | — | — | 1.5 | — | — | — |
| d-2 $M(Vi)_4Q$ | — | — | — | — | 1.5 | 2.5 |
| d-3 $D(Vi)_4$ | — | 0.2 | 0.2 | 1.7 | 0.2 | 0.2 |
| d' $M(H)_{62}Q_{38}$ | — | 1.5 | — | — | — | |

TABLE 3-continued

| Component | Comparative Example 8 | Comparative Example 9 | Comparative Example 10 | Comparative Example 11 | Comparative Example 12 | Comparative Example 13 |
|---|---|---|---|---|---|---|
| e M(H)D(Ph$_2$)M(H) | 21.35 | 20.97 | 20.97 | 20.97 | 20.97 | 20.72 |
| h M(Vi)$_{13}$D(Ep)$_{24}$T(Ph$_2$)$_{46}$(OMe)$_{17}$ | 1 | 2.5 | 1 | 1 | 1 | 1 |
| f Pt catalyst (Pt: ppm) | 5 | 5 | 5 | 5 | 5 | 5 |
| g | 0.02 | 0.02 | 0.02 | 0.02 | 0.02 | 0.02 |
| Total | 100 | 100 | 100 | 100 | 100 | 100 |
| H/Vi ratio | 1.1 | 1.2 | 1.2 | 0.9 | 1 | 0.9 |
| (C)/(D) ratio | — | 67 | 7.9 | 7.9 | 7.9 | 5.0 |
| Evaluation | | | | | | |
| Light transmittance | NG | NG | NG | NG | NG | NG |
| Adhesion | OK | OK | OK | OK | OK | OK |
| Hot-melt properties | OK | NG | OK | OK | OK | OK |
| Die shear strength | OK | OK | OK | OK | OK | OK |

The above results show that the curable hot-melt silicone compositions in the examples of the present invention allowed low tackiness to be maintained even when made into the form of films and thus had better handling, had better melt properties, and allowed cured products having better transparency to be formed upon being cured.

What is claimed is:

1. A curable hot-melt silicone composition, comprising:
(A) a resinous alkenyl group-containing organopolysiloxane that includes at least two alkenyl groups and at least one aryl group per molecule, where the aryl group content is 40 mol % or more;
(B) a curable linear organopolysiloxane that includes at least one aryl group per molecule, where the aryl group content is 40 mol % or more;
(C) a curable linear or branched organopolysiloxane that includes at least one aryl group per molecule, where the aryl group content is less than 40 mol %;
(D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one (ArSiO$_{3/2}$) unit (Ar represents an aryl group) per molecule or that have an aryl group content of 20 mol % or less;
(E) an organohydrogenpolysiloxane having at least 2 silicon atom-bonded hydrogen atoms per molecule, that is different from component (D); and
(F) a curing catalyst,
wherein
the content of component (A) is 5% by mass or more, based on the total mass of the curable hot-melt silicone composition, and the mass ratio of the content of component (C) relative to the content of component (D) is less than 5.0.

2. The curable hot-melt silicone composition according to claim 1, wherein the resinous alkenyl group-containing organopolysiloxane of component (A) comprises a siloxane unit (T unit) represented by RSiO$_{3/2}$ and a siloxane unit (D unit) represented by R$_2$SiO$_{2/2}$ wherein R represents a silicon atom-bonded organic functional group.

3. The curable hot-melt silicone composition according to claim 1, wherein the resinous alkenyl group-containing organopolysiloxane of component (A) is represented by the following average unit formula (I): (R$^1_2$SiO$_{2/2}$)$_s$(R$^1$SiO$_{3/2}$)$_t$
(in the formula, R$^1$ indicates halogen-substituted or unsubstituted monovalent hydrocarbon groups, which may be the same or different, except at least two R$^1$ per molecule are alkenyl groups, 0<s<1, 0<t<1, and s+t=1).

4. The curable hot-melt silicone composition according to claim 1, wherein the curable linear organopolysiloxane of component (B) includes at least one (AlArSiO$_{2/2}$) unit (Al represents an alkyl group, and Ar represents an aryl group) per molecule.

5. The curable hot-melt silicone composition according to claim 1, wherein component (C) comprises a curable linear organopolysiloxane having at least one Al$_2$SiO$_{2/2}$) unit (Al represents an alkyl group) and at least one (Ar$_2$SiO$_{2/2}$) unit (Ar represents an aryl group) per molecule.

6. The curable hot-melt silicone composition according to claim 1, wherein the organopolysiloxane of component (D-3) is a resinous organopolysiloxane represented by average unit formula (IV-c): (R$^6_3$SiO$_{1/2}$)$_p$(ArSiO$_{3/2}$)$_q$
(in the formula, R$^6$ are hydrogen atoms, or halogen-substituted or unsubstituted monovalent hydrocarbon groups, which may be the same or different, Ar represents an aryl group, 0<p<1.0, 0<q<1.0, and p+q=1.0).

7. A sealing material or hot-melt adhesive, comprising the curable hot-melt silicone composition according to claim 1.

8. An optical semiconductor device that has been sealed with the sealing material according to claim 7.

9. The curable hot-melt silicone composition according to claim 2, wherein the curable linear organopolysiloxane of component (B) includes at least one (AlArSiO$_{2/2}$) unit (Al represents an alkyl group, and Ar represents an aryl group) per molecule.

10. The curable hot-melt silicone composition according to claim 3, wherein the curable linear organopolysiloxane of component (B) includes at least one (AlArSiO$_{2/2}$) unit (Al represents an alkyl group, and Ar represents an aryl group) per molecule.

11. The curable hot-melt silicone composition according to claim 2, wherein component (C) comprises a curable linear organopolysiloxane having at least one Al$_2$SiO$_{2/2}$) unit (Al represents an alkyl group) and at least one (Ar$_2$SiO$_{2/2}$) unit (Ar represents an aryl group) per molecule.

12. The curable hot-melt silicone composition according to claim 3, wherein component (C) comprises a curable linear organopolysiloxane having at least one Al$_2$SiO$_{2/2}$) unit (Al represents an alkyl group) and at least one (Ar$_2$SiO$_{2/2}$) unit (Ar represents an aryl group) per molecule.

13. A curable hot-melt silicone composition, comprising:
(A) a resinous alkenyl group-containing organopolysiloxane that includes at least two alkenyl groups and at least one aryl group per molecule, where the aryl group content is 40 mol % or more;

(B) a curable linear organopolysiloxane that includes at least one aryl group per molecule, where the aryl group content is 40 mol % or more;

(C) a curable linear or branched organopolysiloxane that includes at least one aryl group per molecule, where the aryl group content is from about 15 to about 32 mol %;

(D) a silicone reactive compatibilizer having a weight-average molecular weight of 1000 or less, that is selected from: (D-1) cyclic organopolysiloxanes; (D-2) MQ resins; and (D-3) organopolysiloxanes different from component (A), that include at least one $(ArSiO_{3/2})$ unit (Ar represents an aryl group) per molecule or that have an aryl group content of 20 mol % or less;

(E) an organohydrogenpolysiloxane having at least 2 silicon atom-bonded hydrogen atoms per molecule, that is different from component (D); and (F) a curing catalyst, wherein the content of component (A) is 5% by mass or more, based on the total mass of the curable hot-melt silicone composition, and the mass ratio of the content of component (C) relative to the content of component (D) is less than 5.0.

14. The curable hot-melt silicone composition according to claim 13, wherein the resinous alkenyl group-containing organopolysiloxane of component (A) comprises a siloxane unit (T unit) represented by $RSiO_{3/2}$ and a siloxane unit (D unit) represented by $R_2SiO_{2/2}$ wherein R represents a silicon atom-bonded organic functional group.

15. The curable hot-melt silicone composition according to claim 13, wherein the resinous alkenyl group-containing organopolysiloxane of component (A) is represented by the following average unit formula (I): $(R^1_2SiO_{2/2})$ s $(R^1SiO_{3/2})_t$ (in the formula, $R^1$ indicates halogen-substituted or unsubstituted monovalent hydrocarbon groups, which may be the same or different, except at least two $R^1$ per molecule are alkenyl groups, $0<s<1$, $0<t<1$, and $s+t=1$).

16. The curable hot-melt silicone composition according to claim 13, wherein the curable linear organopolysiloxane of component (B) includes at least one $(AlArSiO_{2/2})$ unit (Al represents an alkyl group, and Ar represents an aryl group) per molecule.

17. The curable hot-melt silicone composition according to claim 13, wherein component (C) comprises a curable linear organopolysiloxane having at least one $Al_2SiO_{2/2})$ unit (Al represents an alkyl group) and at least one $(Ar_2SiO_{2/2})$ unit (Ar represents an aryl group) per molecule.

18. The curable hot-melt silicone composition according to claim 13, wherein the organopolysiloxane of component (D-3) is a resinous organopolysiloxane represented by average unit formula (IV-c): $(R^6_3SiO_{1/2})_p(ArSiO_{3/2})_q$ (in the formula, $R^6$ are hydrogen atoms, or halogen-substituted or unsubstituted monovalent hydrocarbon groups, which may be the same or different, Ar represents an aryl group, $0<p<1.0$, $0<q<1.0$, and $p+q=1.0$).

19. A sealing material or hot-melt adhesive, comprising the curable hot-melt silicone composition according to claim 13.

20. An optical semiconductor device that has been sealed with the sealing material according to claim 19.

* * * * *